(12) United States Patent
Chen et al.

(10) Patent No.: US 8,705,975 B2
(45) Date of Patent: Apr. 22, 2014

(54) SINGLE WAVELENGTH BIDIRECTIONAL FIBER OPTICAL LINK WITH BEAM-SPLITTING ELEMENT

(75) Inventors: Ye Chen, San Jose, CA (US); Pengyue Wen, San Jose, CA (US); Bing Shao, Sunnyvale, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 262 days.

(21) Appl. No.: 13/034,398

(22) Filed: Feb. 24, 2011

(65) Prior Publication Data

US 2012/0219300 A1 Aug. 30, 2012

(51) Int. Cl.
*H04B 10/40* (2013.01)
*G02B 6/42* (2006.01)

(52) U.S. Cl.
USPC .......................................... 398/139; 398/138

(58) Field of Classification Search
USPC .......................................................... 398/135
See application file for complete search history.

(56) References Cited

U.S. PATENT DOCUMENTS

| | | | |
|---|---|---|---|
| 5,963,684 A | 10/1999 | Ford | |
| 6,765,935 B2 | 7/2004 | Kimura et al. | |
| 6,892,007 B2 * | 5/2005 | Chen | 385/48 |
| 7,281,965 B2 * | 10/2007 | Torres | 446/250 |
| 7,341,384 B2 * | 3/2008 | Chan et al. | 385/89 |
| 7,654,750 B2 | 2/2010 | Brenner et al. | |
| 7,889,993 B2 * | 2/2011 | Wang et al. | 398/138 |
| 2002/0176135 A1 | 11/2002 | Boord et al. | |
| 2004/0179784 A1 * | 9/2004 | Vancoille et al. | 385/47 |
| 2006/0051033 A1 * | 3/2006 | Tabata et al. | 385/93 |
| 2006/0245697 A1 | 11/2006 | Toillon | |
| 2007/0036493 A1 | 2/2007 | Brenner et al. | |
| 2010/0119229 A1 | 5/2010 | Roelkens et al. | |
| 2012/0002284 A1 * | 1/2012 | McColloch et al. | 359/558 |
| 2012/0039617 A1 * | 2/2012 | Duligall et al. | 398/152 |

FOREIGN PATENT DOCUMENTS

| | | |
|---|---|---|
| EP | 0323602 | 7/1989 |
| EP | 1168687 | 5/2005 |
| GB | 227102 | 7/1990 |
| WO | 0110069 | 8/2001 |

* cited by examiner

*Primary Examiner* — Nathan Curs (57) ABSTRACT

An optical transceiver and method for bidirectionally communicating optical signals in an optical transceiver involve an optical element that bidirectionally separates incoming and outgoing optical signals of the same wavelength. The optical element can be a diffractive element such as a grating or, alternatively, a partially reflective element such as a transparent block having a thin-film coating.

22 Claims, 6 Drawing Sheets

SINGLE WAVELENGTH BIDIRECTIONAL FIBER OPTICAL LINK WITH BEAM-SPLITTING ELEMENT

BACKGROUND

A conventional optical communication link includes at least one optical transmitter at a first end of the link, such as a laser, one optical receiver at a second end of the link, such as a photodiode, and at least one optical fiber interconnecting the transmitter and receiver. Bidirectional optical communication links, in which a single fiber serves both a transmitter and receiver at each end of the communication link, are known. Bidirectional optical communication links typically require that such a transmitter and receiver operate on different wavelengths. That is, at either end of the communication link, the wavelength at which the transmitter transmits optical signals on the fiber is different from the wavelength at which the receiver receives optical signals on the fiber. Wavelength-selective beam splitters are used to separate the transmitted and received optical signals.

SUMMARY

An optical transceiver and method for bidirectionally communicating optical signals in an optical transceiver involve an optical element that bidirectionally separates incoming and outgoing optical signals of the same wavelength.

In an exemplary embodiment, the optical transceiver includes an optical fiber port having an axis, an opto-electronic light source configured to emit a transmitted optical signal having a wavelength, at least one opto-electronic light detector configured to detect optical signals having that same wavelength, and a diffractive optical element interposed along the axis between the optical fiber port and the optical transmitter. The diffractive optical element passes the transmitted optical signal through to the fiber port as the outgoing optical signal. An opto-electronic light detector is oriented to receive an incoming signal that is diffractively redirected by the diffractive optical element. The diffractive optical element can be configured to diffractively split the transmitted optical signal into a second optical signal as well as the first or outgoing optical signal, and a second opto-electronic light detector can be included to detect the second optical signal.

In another exemplary embodiment, an optical transceiver includes an optical fiber port having an axis, an opto-electronic light source configured to emit a transmitted optical signal having a wavelength, at least one opto-electronic light detector configured to detect optical signals having that same wavelength, and a partially reflective optical element interposed along the axis between the optical fiber port and the optical transmitter. The partially reflective optical element passes the transmitted optical signal through to the optical fiber port as the outgoing optical signal. An opto-electronic light detector is oriented to receive an incoming optical signal that is reflected by the partially reflective optical element. The partially reflective optical element can be configured to split the transmitted optical signal into a second optical signal as well as the first or outgoing optical signal, and a second opto-electronic light detector can be included to detect the second optical signal.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
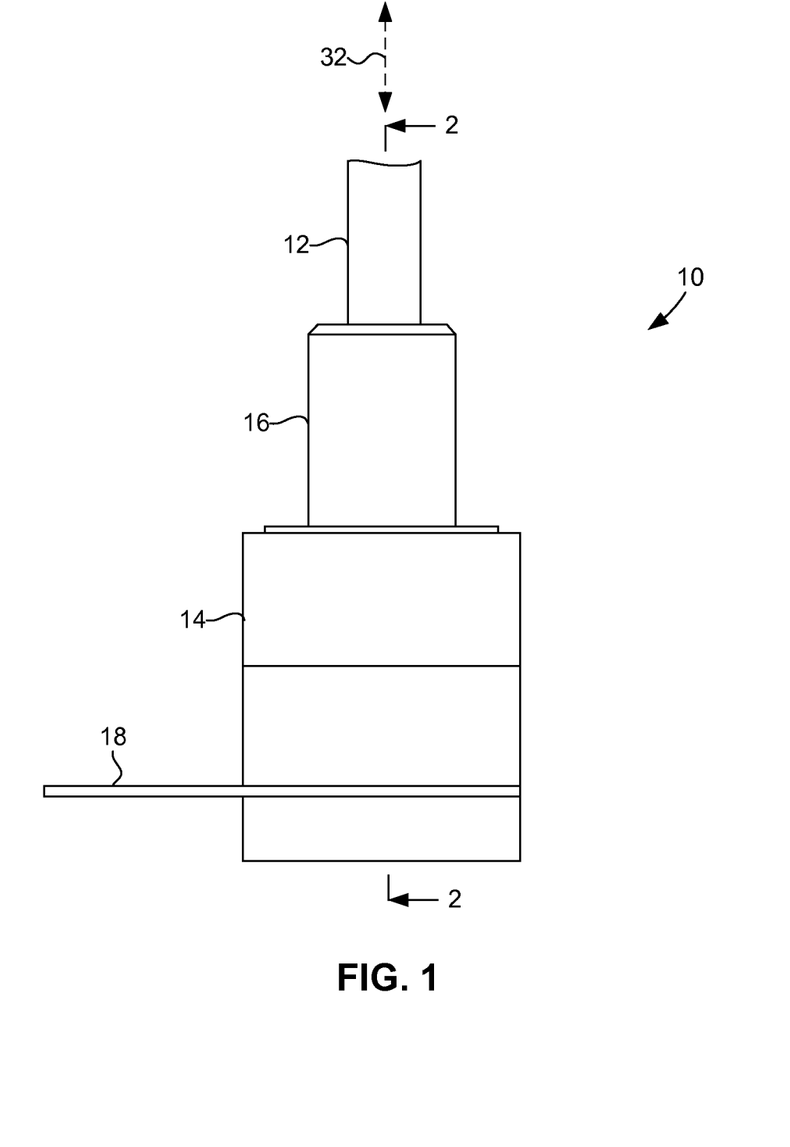
FIG. 1 is a side elevation view of a bidirectional fiber-optic transceiver, in accordance with an exemplary embodiment of the invention.
Figure 2:
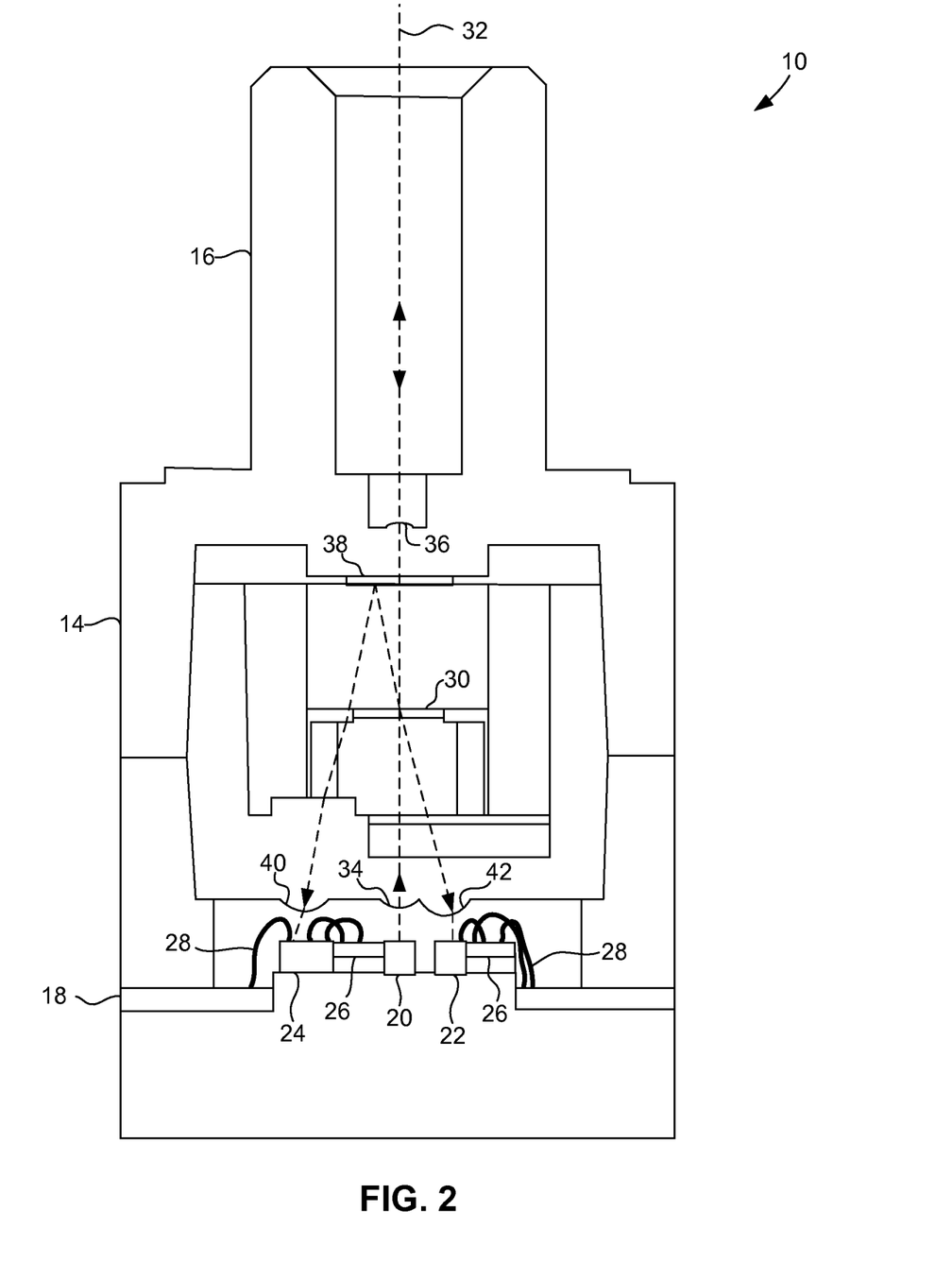
FIG. 2 is a cross-sectional view of the transceiver of FIG. 1, taken on line 2-2 of FIG. 1.

As illustrated in FIGS. 1-2, in an illustrative or exemplary embodiment of the invention, an optical transceiver 10 can bidirectionally communicate, i.e., transmit and receive, optical signals through an optical fiber 12. Optical transceiver 10 has a generally barrel-shaped housing or body 14. Optical fiber 12 is received in a fiber port 16 at a distal end of body 14. Within the proximal end of body 14 are opto-electronic and electronic devices mounted on a printed circuit board 18. The opto-electronic devices can include a laser or other light source 20, such as a vertical cavity surface-emitting laser (VCSEL). Light source 20 produces or emits the optical signals in response to electrical signals with which it is driven. These optical signals are transmitted from transceiver 10 in the manner described in further detail below. The opto-electronic devices can further include a photodiode or other primary light detector 22, such as a positive-intrinsic-negative (PIN) diode. Primary light detector 22 produces electrical signals in response to the optical signals that are received by transceiver 10 and impinge upon primary light detector 22 in the manner described in further detail below. The opto-electronic devices can also include a similar photodiode or other monitor light detector 24. Monitor light detector 24 produces electrical signals in response to a portion of the transmitted optical signals impinge upon it. Electronic devices 26, such as driver and receiver integrated circuits, can be included to process the electrical signals. The various opto-electronic and electronic devices can be interconnected by wirebonds 28 in a conventional manner. Electrical signals that represent the information carried in the transmitted and received optical signals can be communicated with other (external) systems by electrical contacts (not shown) on printed circuit board 18.

A diffractive optical element 30, such as a diffraction grating, is retained in body 14. The optical signals to be transmitted are emitted by light source 20 along an axis 32. In the illustrated embodiment axis 32 represents the axis along which light source 20 emits optical signals, the axis along which the transmitted or outgoing optical signals are emitted from optical transceiver 10, and the axis along which incoming optical signals are received by optical transceiver 10. That is, light source 20 is aligned along the same axis 32 on which the incoming and outgoing optical signals are respectively transmitted and received by optical transceiver 10. Nevertheless, in other embodiments optical elements can be included that redirect the various optical signals in other ways along other axes. In the illustrated embodiment, the optical signals to be transmitted are emitted by light source 20 along axis 32 and, in part, pass through diffractive optical element 30 along axis 32, and enter the end of the optical fiber 12 (not shown in FIG. 2 for purposes of clarity) that is retained in fiber port 16.

In addition to diffractive optical element 30, the optical elements that are interposed in the optical path between light source 20 and fiber port 16 can include one or more lenses. Such lenses can include, for example, a first lens 34 adjacent light source 20 and a second lens 36 adjacent fiber port 16. First lens 34 can help collimate the optical signals emitted by light source 20 along axis 32. Body 14 can be made of a material that is transparent to the transmitted and received optical signals. An example of such as a material is available under the brand name ULTEM® (e.g., ULTEM 1010), which is an amorphous thermoplastic material produced by SABIC Innovative Plastics of Saudi Arabia (formerly General Electric Plastics Division). As body 14 is made of an optically transparent material in the illustrated embodiment, first and second lenses 34 and 36 can be defined by portions of body 14 that are unitarily molded with the surrounding portions of body 14.

Diffractive optical element 30 diffractively splits the transmitted optical signal that impinges upon it along axis 32 into a first portion and a second portion. As indicated in broken line in FIG. 2, the first portion passes through diffractive optical element along axis 32 as described above. As similarly indicated in broken line in FIG. 2, the second portion is diffractively redirected toward a reflective surface 38 at a (non-zero) angle with respect to axis 32. This second portion is reflected by reflective surface 38 in a direction toward monitor light detector 24. A third lens 40 can be included in body 14 adjacent monitor light detector 24 to help focus the second portion of the received optical signal upon monitor light detector 24. In response to the second portion of the transmitted optical signal that impinges upon monitor light detector 24, monitor light detector 24 produces the above-described electrical signals. As well understood in the art, electrical signals produced by monitor light detector 24 can be used by feedback circuitry included in electronic devices 26 to control light source 20.

Diffractive optical element 30 diffractively redirects the received optical signal that impinges upon it along axis 32. As indicated in broken line in FIG. 2, the received optical signal is thus redirected at a (non-zero) angle with respect to axis 32 toward primary light detector 22. A fourth lens 42 can be included in body 14 adjacent primary light detector 22 to help focus the received optical signal upon primary light detector 22. In response to the received optical signal that impinges upon primary light detector 22, primary light detector 22 produces the above-described electrical signals.

Diffractive optical element 30 can be formed by any suitable process known in the art. For example, diffractive optical element 30 can be formed by photolithographically patterning and etching a substrate made of a suitable material, such as glass or plastic. Alternatively, diffractive optical element 30 can be formed by a well-known process referred to as "replication" or "printing." In this process, a thin polymer layer is deposited on the surface of a substrate such as glass, and a grating pattern is transferred to the polymer layer by forcing a patterned master element into contact with the polymer layer. As these processes are well understood in the art, they are not described in further detail herein.

Figure 3:
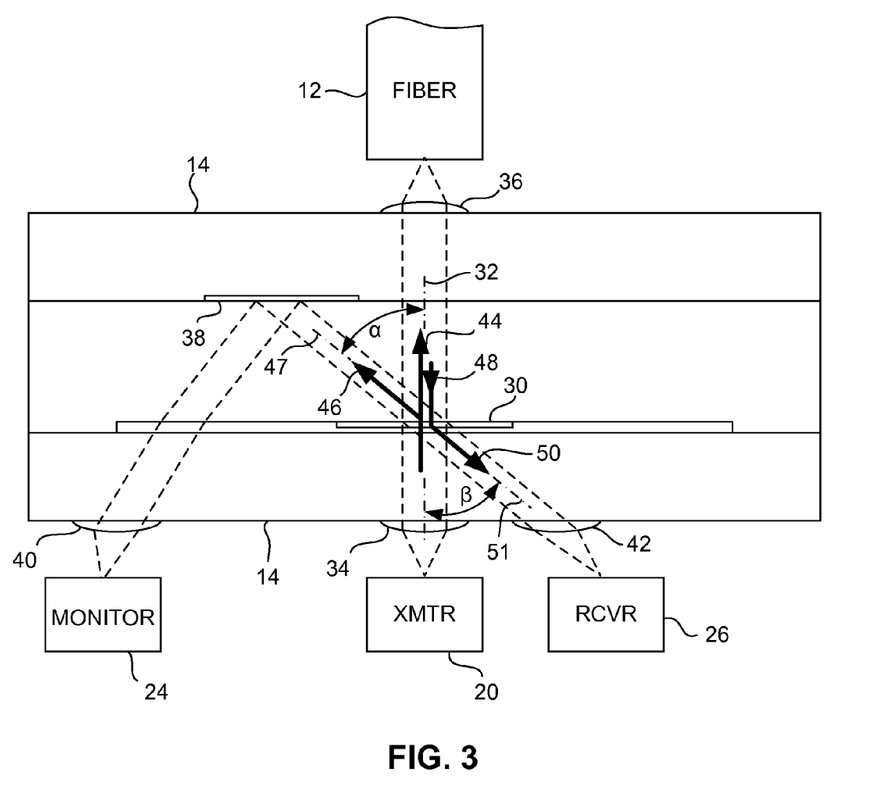
FIG. 3 is an optical schematic diagram of the transceiver of FIG. 1, showing the optics.

The operation of optical transceiver 10 can also be described with reference to the optical schematic diagram of FIG. 3. Note that the first portion of the transmitted optical signal is emitted in a direction 44 along axis 32 while the second portion of the transmitted optical signal is redirected in a direction 46 along another axis 47, which is oriented at an angle α with respect to axis 32. Also note that the received optical signals are received in a direction 48 along axis 32 and redirected in a direction 50 along still another axis 51, which is oriented at an angle 13 with respect to axis 32.

In the exemplary embodiment, in which diffractive optical element 30 lies in a plane that is normal to axis 32, axis 32 is defined by the 0 diffraction order of diffractive optical element 30, axis 47 is defined by the −1 diffraction order of diffractive optical element 30, and axis 51 is defined by the +1 diffraction order of diffractive optical element 30. Thus, the first portion of the transmitted optical signal is associated with the 0 diffraction order of diffractive optical element 30, and the second portion of the transmitted optical signal is associated with the −1 order of diffractive optical element 30. As well understood in the art, the angle of diffraction θ can be determined by the following equation: $d \sin(\theta_m) = m\lambda$, where m is an integer representing the diffraction order, and d is the grating period. Using this equation, the angles of diffraction α and β (FIG. 3) can be determined from the diffraction orders associated with the first and second portions of the transmitted optical signal and their wavelength. In the exemplary embodiment, the angle of diffraction α corresponds to the +1 diffraction order of optical element 30, and the angle of diffraction β corresponds to the −1 diffraction order of optical element 30.

Although in the illustrated embodiment, the second portion of the transmitted optical signal and the redirected received optical signal are co-linear (i.e., oriented along co-linear axes 47 and 51, respectively) and oppositely directed (i.e., in directions 46 and 50, respectively), in other embodiments the second portion of the transmitted optical signal and the redirected received optical signal can be oriented in any other suitable directions. Such other directions can be defined by other diffraction orders, such as, for example, −2, +2, etc. By orienting the second portion of the transmitted optical signal and the redirected received optical signal along axes defined by diffraction orders, the transmitted optical signal and received optical signal can efficiently maintain the same wavelength.

Figure 4:
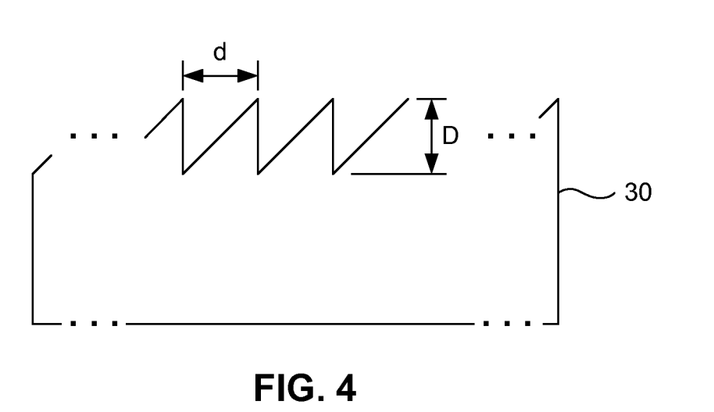
FIG. 4 is a generalized side-elevation view of the diffraction grating of the optics.
Figure 5:
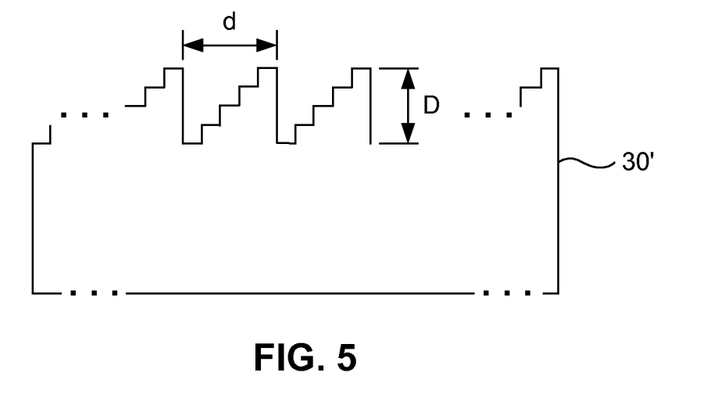
FIG. 5 is a generalized side-elevation view similar to FIG. 4, showing an alternative diffraction grating.

As illustrated in FIG. 4, diffractive optical element 30 can comprise a diffraction grating having what is commonly referred to in the art as a continuous sawtooth profile. In a continuous sawtooth profile, the ramped portion between the peaks or ridge tops is smooth or continuous. As illustrated in FIG. 5, an alternative diffractive optical element (30') can comprise a diffraction grating having what is commonly referred to in the art as a stepped or digitized sawtooth profile. In a stepped or digitized sawtooth profile, the ramped portion between the grating peaks or ridge tops comprises multiple steps. Each of diffractive optical elements 30 has ridges with a spacing d (i.e., the dimension between adjacent peaks or ridge tops) and a depth D (i.e., the vertical dimension between the peak and trough of each ridge, perpendicular to the plane of the grating). Although in the exemplary embodiment a sawtooth profile may provide the advantages described below, in other embodiments a grating can have any other suitable profile known in the art, such as a triangular, sinusoidal or random profile.

The profile, dimensions, or other characteristics of diffractive optical element 30 can be selected to promote concentration of most of the optical energy in the diffraction orders associated with the first and second portions of the transmitted optical signal. For example, in the exemplary embodiment in which the first portion of the transmitted optical signal is associated with the 0 diffraction order of diffractive optical element 30, and the second portion of the transmitted optical signal is associated with the +1 order of diffractive optical element 30, a sawtooth profile as shown in FIGS. 4 and 5 may promote concentration of optical energy in the 0 and +1 diffraction orders at the expense of other diffraction orders.

The profile, dimensions, and other characteristics of diffractive optical element 30 can also be selected to promote minimization of modal noise due to polarization dependency of diffractive optical element 30. Diffractive optical element 30 may behave differently in terms of efficiency for incoming beams with different polarizations. There is a relationship between polarization dependency and the phase contrast between adjacent grating ridges. A sawtooth profile as shown in FIGS. 4 and 5 may promote minimization of phase contrast between adjacent grating ridges and thus help minimize polarization dependency and resulting modal noise.

Also, the depth D can be selected to achieve a desired or target power splitting ratio between the 0 and +1 diffraction orders. For example, it may be possible to achieve equal power splitting between the 0 and +1 diffraction orders by selecting the depth D to be about 1.6 of the grating period d with the grating period d equal to the wavelength of the optical signals. Alternatively, it may be possible to achieve a higher power splitting ratio between the 0 diffraction order and the +1 diffraction order by selecting a shallower grating depth D. To optimize the communication link performance, the power splitting ratio can be selected to maximize the product of the $0^{th}$ order and $1^{st}$ order efficiencies, which represents the lowest link loss. The depth D can also be selected to minimize undesirable reflection of optical energy in certain diffraction orders. For example, the depth D is related to the amount of energy in the received optical signal that is undesirably reflected in direction 46. Such reflected optical energy could interfere, i.e., cause crosstalk, with the second portion of the transmitted optical signal. Reducing the depth D can reduce such back reflection.

Figure 6:
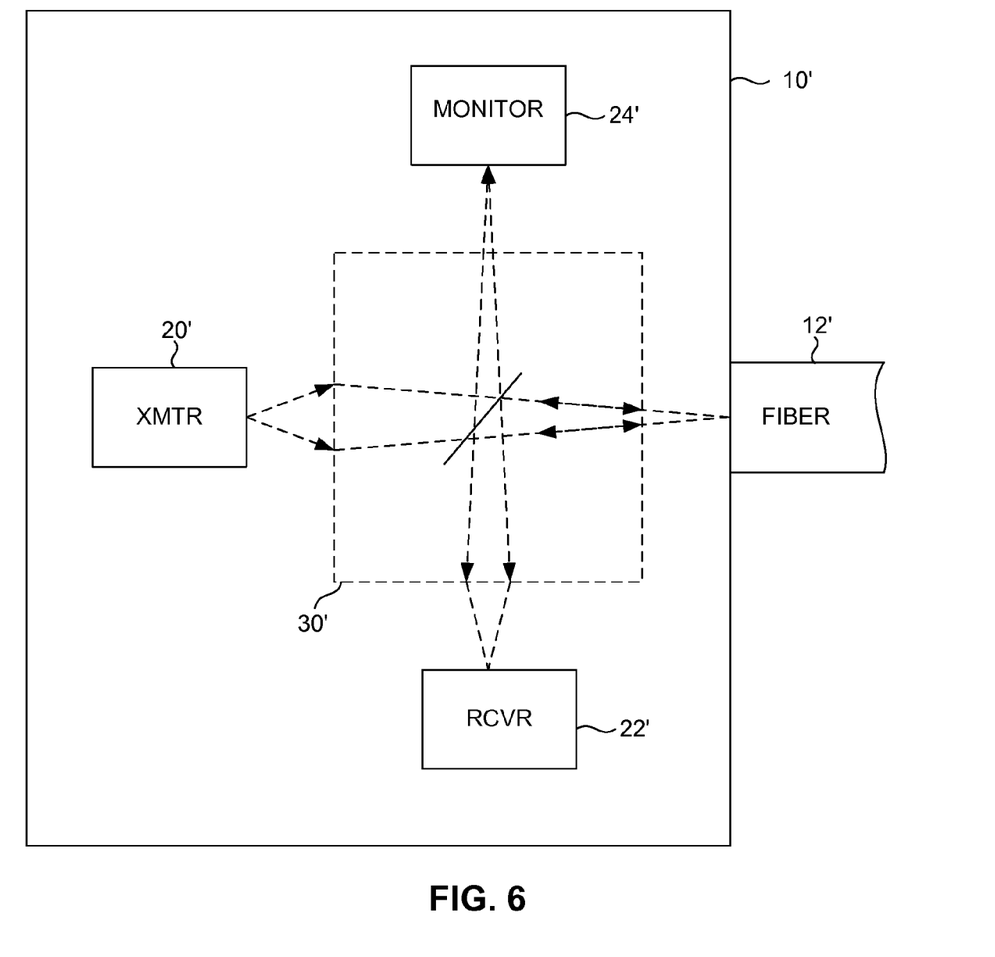
FIG. 6 is an optical schematic diagram similar to FIG. 3, showing alternative optics.
Figure 7:
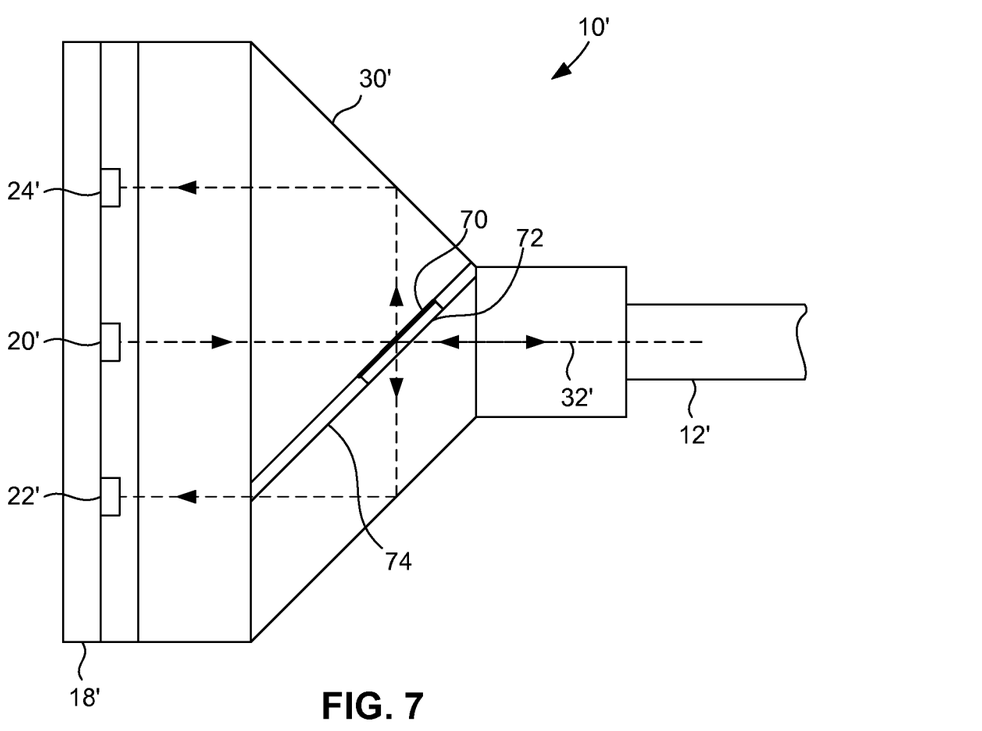
FIG. 7 is a cross-sectional view similar to FIG. 2, showing the optics of FIG. 6 in an alternative transceiver.

As illustrated in FIG. 6, in another embodiment an optical transceiver 10' can include a partially reflective optical element 30'. As illustrated in FIG. 7, partially reflective optical element 30' can comprise a partially reflective, partially transmissive thin-film coating 70 on a suitable transparent substrate 72, such as glass or plastic. Coating 70 can provide a polarization-independent filter. The coated substrate 72 can be retained in a slot 74 in a block of optically transparent material and secured with index-matching epoxy or other suitable adhesive. The coated substrate 72 can be oriented at, for example, a 45-degree angle with respect to the axis 32' along which the transmitted and received optical signals are oriented.

In the embodiment illustrated in FIGS. 6-7, a transmitted optical signal emitted by the opto-electronic light source 20' impinges upon partially reflective optical element 30', which splits the transmitted optical signal into a first portion and a second portion. The first portion passes through partially reflective optical element 30' and becomes the outgoing signal that leaves the transceiver through optical fiber 12' as the outgoing optical signal. The second portion is reflected and thus redirected at a 90-degree angle at the boundary between thin-film coating 70 and transparent substrate 72. In the illustrated embodiment, transparent substrate 72 can have a prism-like shape to provide reflective walls. The reflected second portion is further reflected by a wall of transparent substrate 72 onto a monitor light detector 24'.

An incoming or received optical signal that is emitted from the end of optical fiber 12' impinges upon partially reflective optical element 30', which reflects the received optical signal at a 90-degree angle at the boundary between thin-film coating 70 and transparent substrate 72. The reflected optical signal is further reflected by another wall of transparent substrate 72 onto a primary light detector 22'.

One or more illustrative or exemplary embodiments of the invention have been described above. However, it is to be understood that the invention is defined by the appended claims and is not limited to the specific embodiments described.

What is claimed is:

1. An optical transceiver, comprising:
    an optical fiber port having an axis;
    a body made of a material transparent to a transmitted optical signal and a received optical signal;
    an opto-electronic light source configured to emit the transmitted optical signal;
    a first lens formed on a surface of the body and oriented to receive the transmitted optical signal emitted by the opto-electronic light source;
    a diffractive optical element rigidly retained in the body and interposed along the axis between the optical fiber port and the opto-electronic light source, the transmitted optical signal passing through the first lens and the body and impinging upon the diffractive optical element, the diffractive optical element configured to pass a first portion of the transmitted optical signal through the diffractive optical element to the optical fiber port along the axis, the diffractive optical element being further configured to diffractively split the transmitted optical signal into the first portion and a second portion and diffractively redirect the second portion of the transmitted optical signal in a direction oriented at a second non-zero angle with respect to the axis;
    a second lens formed on a surface of the body and oriented to receive the received optical signal diffractively redirected from the diffractive optical element at a first non-zero angle with respect to the axis, the received optical signal being transmitted through the body and the second lens;
    a first opto-electronic light detector oriented to receive the received optical signal transmitted through the second lens;
    a third lens formed on the surface of the body and oriented to receive the second portion of the transmitted optical signal diffractively redirected from the diffractive optical element, the second portion of the transmitted optical signal being transmitted through the body and the third lens; and
    a second opto-electronic light detector oriented to receive the second portion of the transmitted optical signal through the third lens.

2. The optical transceiver of claim 1, wherein the axis is normal to a plane of the diffractive optical element.

3. The optical transceiver of claim 1, wherein the diffractive optical element comprises a diffraction grating.

4. The optical transceiver of claim 1, wherein the first non-zero angle corresponds to an integer order of diffraction of the transmitted optical signal.

5. The optical transceiver of claim 4, wherein the integer order of diffraction of the transmitted optical signal corresponding to the first non-zero angle is +1.

6. The optical transceiver of claim 1, wherein the second non-zero angle corresponds to an integer order of diffraction of the received optical signal.

7. The optical transceiver of claim 6, wherein the integer order of diffraction of the transmitted optical signal corresponding to the second non-zero angle is −1.

8. A method for communicating optical signals in an optical transceiver having a diffractive optical element rigidly retained in body made of a material transparent to a transmitted optical signal and a received optical signal, comprising:
   providing the transmitted optical signal at an opto-electronic light source;
   directing the transmitted optical signal along an axis and through a first lens formed on a surface of the body and through a portion of the body;
   impinging the transmitted optical signal on the diffractive optical element along the axis;
   passing a first portion of the transmitted optical signal through the diffractive optical element along the axis and into an end of an optical fiber;
   directing a received optical signal from the end of the optical fiber along the axis;
   impinging the received optical signal on the diffractive optical element along the axis;
   diffractively redirecting the received optical signal at the diffractive optical element at a first non-zero angle with respect to the axis and through the body and a second lens formed on the surface of the body;
   impinging the redirected received optical signal upon a first opto-electronic light detector;
   diffractively splitting the transmitted optical signal at the diffractive optical element into the first portion and a second portion;
   diffractively redirecting the second portion of the transmitted optical signal in a direction oriented at a second non-zero angle with respect to the axis and through the body and a third lens formed on the surface of the body; and
   impinging the redirected second portion of the transmitted optical signal upon a second opto-electronic light detector.

9. The method of claim 8, wherein the axis is normal to a plane of the diffractive optical element.

10. The method of claim 8, wherein the diffractive optical element comprises a diffraction grating.

11. The method of claim 8, wherein the first non-zero angle corresponds to an integer order of diffraction of the transmitted optical signal.

12. The method of claim 11, wherein the integer order of diffraction of the transmitted optical signal corresponding to the first non-zero angle is +1.

13. The method of claim 8, wherein the second non-zero angle corresponds to an integer order of diffraction of the received optical signal.

14. The method of claim 13, wherein the integer order of diffraction of the transmitted optical signal corresponding to the second non-zero angle is −1.

15. An optical transceiver, comprising:
   an optical fiber port having an axis;
   an opto-electronic light source configured to emit a transmitted optical signal into a body made of a material transparent to the transmitted optical signal and a received optical signal;
   a partially reflective optical element rigidly retained within the body and interposed along the axis between the optical fiber port and the optical transmitter, the partially reflective optical element configured to pass a first portion of the transmitted optical signal through the body and to the optical fiber port along the axis, the partially reflective optical element further configured to split the transmitted optical signal into the first portion and a second portion and redirect the second portion of the transmitted optical signal in a direction oriented at a second non-zero angle with respect to the axis;
   a first opto-electronic light detector oriented to receive the received optical signal reflected from the partially reflective optical element at a first non-zero angle with respect to the axis and transmitted through the body; and
   a second opto-electronic light detector oriented to receive the second portion of the transmitted optical signal.

16. The optical transceiver of claim 15, wherein the axis is oriented at an oblique angle to a partially reflective plane of the beam-splitting optical element.

17. The optical transceiver of claim 16, wherein the oblique angle is 45 degrees.

18. The optical transceiver of claim 15, wherein the partially reflective optical element comprises a transparent substrate block having a partially reflective thin-film coating.

19. A method for communicating optical signals in an optical transceiver having a partially reflective optical element rigidly retained within a body made of a material transparent to a transmitted optical signal and a received optical signal, comprising:
   providing the transmitted optical signal at an opto-electronic light source;
   directing the transmitted optical signal along an axis and into the body;
   impinging the transmitted optical signal on the partially reflective optical element along the axis and within the body;
   passing a first portion of the transmitted optical signal through the partially reflective optical element along the axis, through the body, and into an end of an optical fiber;
   splitting the transmitted optical signal at the partially reflective optical element into the first portion and a second portion and reflecting the second portion of the transmitted optical signal in a direction oriented at a second non-zero angle with respect to the axis;
   directing a received optical signal from the end of the optical fiber along the axis and into the body;
   impinging the received optical signal on the partially reflective optical element along the axis and within the body;
   reflecting the received optical signal at the partially reflective optical element in a direction oriented at a non-zero angle with respect to the axis;
   impinging the reflected received optical signal upon a second opto-electronic light detector; and
   impinging the second portion of the transmitted optical signal upon a second opto-electronic light detector.

20. The method of claim 19, wherein the axis is oriented at an oblique angle to a partially reflective plane of the partially reflective optical element.

21. The method of claim 20, wherein the oblique angle is 45 degrees.

22. The method of claim 19, wherein the partially reflective optical element comprises a transparent substrate block having a partially reflective thin-film coating.

* * * * *